Patented Sept. 8, 1931

1,822,065

UNITED STATES PATENT OFFICE

EDUARD SPRÖNGERTS, MAXIMILIAN PAUL SCHMIDT, AND ROBERT FRANKE, OF WIESBADEN-BIEBRICH, GERMANY, ASSIGNORS TO KALLE & CO. AKTIENGESELLSCHAFT, OF WIESBADEN-BIEBRICH, GERMANY

AZO DYESTUFF COMPONENTS AND PROCESS OF PREPARING THEM

No Drawing. Application filed October 14, 1929, Serial No. 399,714, and in Germany October 19, 1928.

The present invention relates to azo dyestuff components and to a process of preparing them.

We have found that valuable azo dyestuff components are obtained by causing a cyanamide to act upon a compound of the following constitution:

wherein R stands for a naphthalene nucleus which is not substituted in ortho- or paraposition to the hydroxy group. The reaction is advantageously carried out in such a manner that, for instance, cyanamide or dicyanamide is caused to act upon the hydrochlorides of the hydroxynaphthylamines in an aqueous solution or an alcoholic solution. The amino hydroxy compounds which are used may contain any substituents, such as, for instance, halogens, sulfo acids and others. The hydroxy aryl guanidines may contain also in the nucleus further groups, such as, for instance, sulfamide-, methyl-, methoxyl- groups, halogen and others and in the guanidine group substituents, such as, for instance, alkyl- or aralkyl-groups. Finally the hydroxy group may also be substituted by such groups as are capable of being easily split off by alkali, such as, for instance, acyl groups.

The new products which are very useful as azo dyestuff components, have the following general formula:

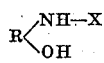

wherein R stands for a naphthalene nucleus which is not substituted in ortho- or paraposition to the hydroxy group and X for a residue of the group consisting of

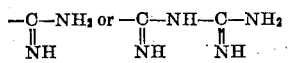

The following examples serve to illustrate our invention, but they are not intended to limit it thereto, the parts being by weight:

(1) 195 parts (1 mol.) of the hydrochloride of 1.7-amino-naphthol and 60 parts of cyanamide are boiled about 8 hours in an alcoholic solution. After the alcohol is evaporated, the residue is dissolved in hot water, the solution is treated with animal charcoal and filtered. After some time has elapsed, the hydrochloride of the 7-hydroxy-naphthalene-1-guanidine of probably the following formula:

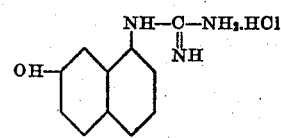

crystallizes out in small, well defined crystals; by salting out, further quantities can be obtained. It is readily soluble in water, alcohol and acetone and melts at 113° C. to 114° C. The free base is readily soluble in diluted caustic soda solution or hot water, moderately soluble in alcohol, sparingly or not at all soluble in dilute soda solution, ether and acetone. It crystallizes from alcohol or water in little, hard, regularly formed crystals and melts at 225° C. to 226° C., while becoming brown and decomposed.

(2) 195 parts (1 mol.) of 1.5-amino-naphtholhydrochloride and 125 parts of dicyandiamide are heated for about 10–15 hours in 500 c..c. of water. From the solution which has been treated with animal charcoal the 5-hydroxynaphthalene-1-biguanidine is obtained as the hydrochloride. It crystallizes from water in broad long needles having a melting point of 216° C. to 217° C. It is difficultly soluble in alcohol and acetone and readily soluble in water. The free base crystallizes from water in small laminæ; it is readily soluble in diluted alkalies and in hot water and very sparingly soluble in ether. It melts at 143° C. to 144° C. while swelling up.

In an analogous manner the 7-hydroxy-naphthalene-1-biguanidine or the 7-hydroxy-naphthalene-2-biguanidine may be obtained.

The hydrochloride of the 7-hydroxy-naphthalene-1-biguanidine crystallizes from water in form of laminæ and melts at 235° C. to 237° C., while becoming brown and swelling up. The hydrochloride of 7-hydroxy-naphthalene-2-biguanidine melts at 218° C. to 219° C.

The hydroxynaphthylguanidines may be used in dyestuff industries and with special advantage also in the production of diazotypes.

For preparing diazo-types the afore-mentioned compounds can be applied in aqueous solutions on paper on any other base, such as for instance a viscose-film or an acetate-film. They yield pictures having a white ground and being of excellent fastness to water. Among others naphtholguanidines or naphtholbiguanidine are very suitable for this purpose.

These hydroxyarylguanidines and biguanidines may not only be applied on paper together with the diazo component, but also be used for the subsequent developing of papers which only carry the diazo component.

Such substances may also be added to the solutions of the guanidines as are capable of making the diazo compounds more stable or more readily soluble, such as, for instance, naphthalene trisulfonic acid or metallic salts or such as serve for improving the ground or for forming lacquers of the dyestuffs which are produced.

We claim:

1. Process of preparing azo dyestuff components, which consists in causing a cyanamide to act upon a compound of the following constitution:

wherein R stands for the naphthalene nucleus non-substituted in ortho- or para-position to the hydroxy group.

2. Process of preparing azo dyestuff components, which consists in causing dicyandiamide to act upon a compound of the following constitution:

wherein R stands for the naphthalene nucleus non-substituted in ortho- or para-position to the hydroxy group.

3. Process of preparing azo dyestuff components, which consists in causing dicyandiamide to act upon a compound of the following constitution:

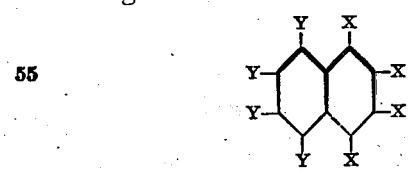

wherein one of the X's stands for $NH_2$, the other X's for hydrogen atoms and one of the Y's for OH and the other Y's for hydrogen atoms.

4. Process of preparing azo dyestuff components, which consists in causing dicyandiamide to act upon a compound of the following constitution:

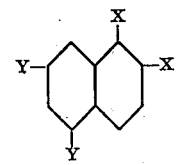

wherein one X stands for H, the other X for $NH_2$ and one Y for H and the other Y for OH.

5. Process of preparing azo dyestuff components, which consists in causing dicyandiamide to act upon 1.7-aminonaphthol.

6. As new products, compounds of the following formula:

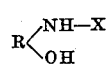

wherein R stands for a naphthalene nucleus non-substituted in ortho- or para-position to the hydroxy group and X for a residue of the group consisting of

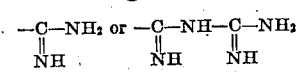

said products being soluble in caustic alkalies and in acids.

7. As new products, compounds of the following formula:

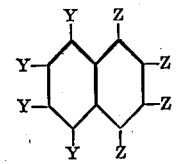

wherein one of the Z's stands for the residue NHX, X being a substituent of the group consisting of

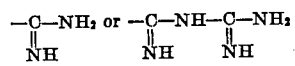

the other Z's for hydrogen and one of the Y's stands for OH, the other Y's stand for H, said products being soluble in caustic alkalies and in acids.

8. As new products, compounds of the following formula:

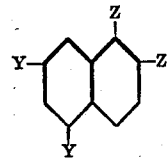

wherein one Z stands for hydrogen, the other Z for the residue $-NH-X$, X being a substituent of the group consisting of

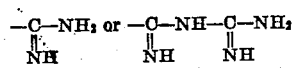

and one Y stands for hydrogen, the other Y for OH, said products being soluble in caustic alkalies and in acids.

9. As new products, compounds of the following formula:

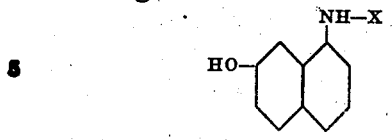

wherein X stands for a residue of the group consisting of

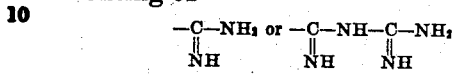

said products being soluble in caustic alkalies and in acids.

10. As a new product, 7 oxy-naphthalene-1-biguanidine of the following formula:

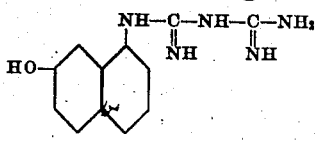

yielding a hydrochloride which crystallized from water forms laminæ melting at 235° C.—237° C., while swelling up and turning a brownish color.

In testimony whereof, we affix our signatures.

EDUARD SPRÖNGERTS.
MAXIMILIAN PAUL SCHMIDT.
ROBERT FRANKE.